United States Patent
Wang

(10) Patent No.: US 8,625,614 B2
(45) Date of Patent: Jan. 7, 2014

(54) FEMTOCELL AND INTERNET ACCESSING METHOD

(75) Inventor: Shao-Yuan Wang, Taipei Hsien (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 584 days.

(21) Appl. No.: 12/975,376

(22) Filed: Dec. 22, 2010

(65) Prior Publication Data

US 2012/0106444 A1    May 3, 2012

(30) Foreign Application Priority Data

Oct. 27, 2010    (TW) .............................. 99136701 A

(51) Int. Cl.
*H04L 12/28*    (2006.01)
(52) U.S. Cl.
USPC .......................... 370/401; 370/463; 709/238
(58) Field of Classification Search
None
See application file for complete search history.

(56) References Cited

U.S. PATENT DOCUMENTS

| | | | | |
|---|---|---|---|---|
| 7,292,571 B2 * | 11/2007 | Brown | ................... | 370/389 |
| 7,453,852 B2 * | 11/2008 | Buddhikot et al. | ........... | 370/331 |
| 7,630,341 B2 * | 12/2009 | Buddhikot et al. | ........... | 370/331 |
| 8,005,098 B2 * | 8/2011 | Barach et al. | ................. | 370/400 |
| 2010/0093359 A1 | 4/2010 | Gallagher et al. | | |
| 2010/0128677 A1 * | 5/2010 | Liu et al. | ....................... | 370/328 |
| 2012/0214445 A1 * | 8/2012 | Stojanovski et al. | ......... | 455/411 |
| 2012/0281635 A9 * | 11/2012 | Venkatachalam | ............. | 370/329 |

* cited by examiner

*Primary Examiner* — Alex Skripnikov
(74) *Attorney, Agent, or Firm* — Altis Law Group, Inc.

(57) ABSTRACT

A femtocell to allow a user terminal device access to the Internet includes a tunnel communication module to establish a secure tunnel between the user terminal device and the Internet and a network address translator to translate network address for the user terminal device. The femtocell selects the network address translator to allow the user terminal device access to the Internet upon the condition that the user terminal device requires a video streaming service. The femtocell further selects the network address translator or the tunnel communication module according to a speed of the user terminal device accessing the Internet upon the condition that the user terminal device requires a web service.

11 Claims, 4 Drawing Sheets

FEMTOCELL AND INTERNET ACCESSING METHOD

BACKGROUND

1. Technical Field

Embodiments of the present disclosure relate to data transmitting technology, and more particularly to a femtocell and an internet accessing method thereof.

2. Description of Related Art

Femtocells are used to allow user terminal devices access to the Internet. Generally, a femtocell establishes a secure tunnel and the user terminal devices communicate with the Internet over the secure tunnel. The secure tunnel increases security of wireless communication between the user terminal devices and the Internet. However, the secure tunnel requires a long time to certificate data from or to the user terminal devices. Therefore, the user terminal devices need to wait for the long time, which decreases accessing speed and customer satisfaction. There remains a heretofore unaddressed need to overcome the limitations described.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

All of the processes described may be embodied in, and fully automated over, software code modules executed by one or more general purpose computers or processors. The code modules may be stored in any type of computer-readable medium or other storage device. Some or all of the methods may alternatively be embodied in specialized computer hardware or communication apparatus.

Figure 1:
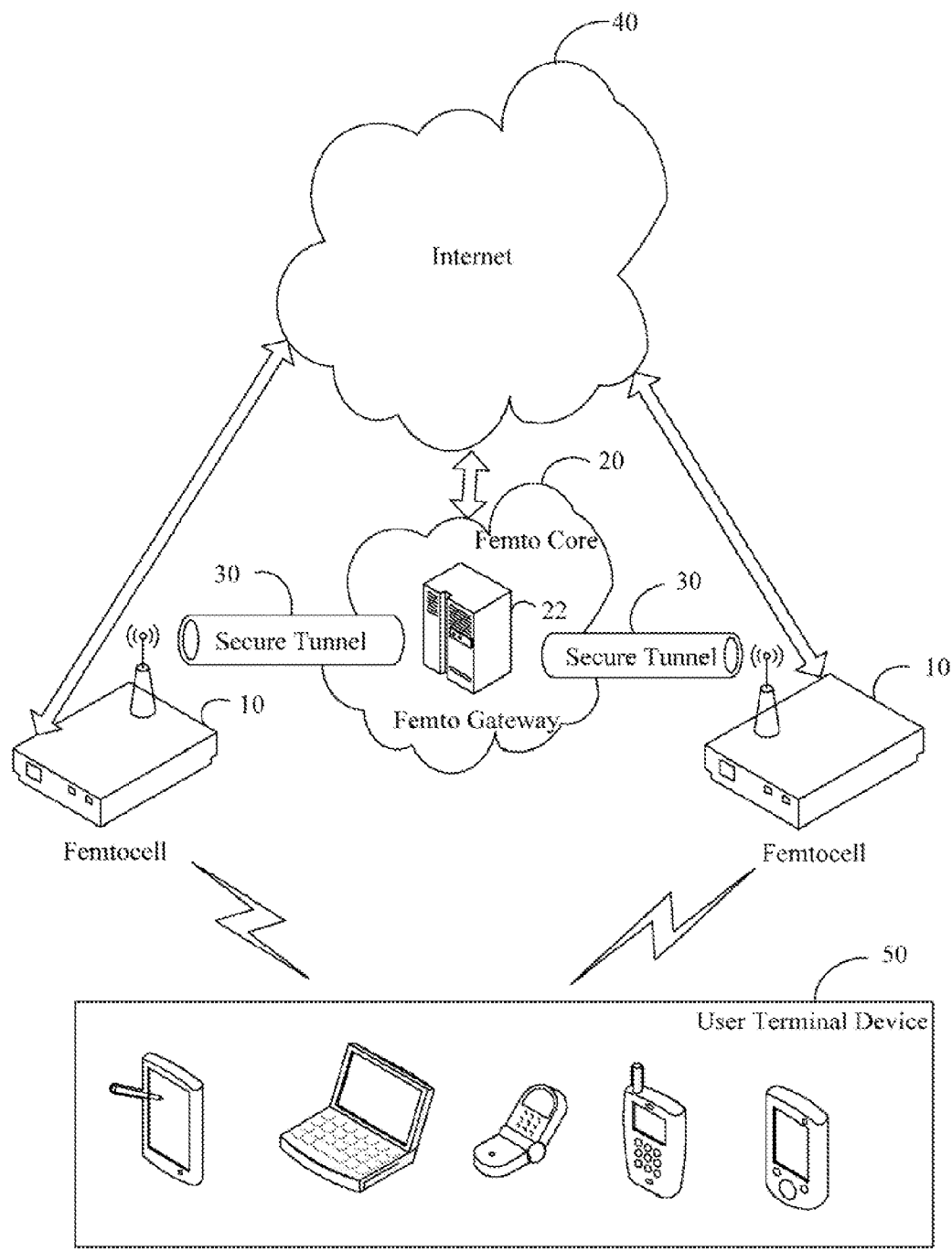
FIG. 1 is a schematic diagram of environment of one embodiment a femtocell of the present disclosure.

FIG. 1 is a schematic diagram of environment of one embodiment of a femtocell 10 of the present disclosure. In one embodiment, the femtocell 10 can be used by a user terminal device 50 to access to the Internet 40. In one embodiment, the user terminal device 50 may be a mobile phone, a personal digital assistant (PDA), a computer, a set-top box, or a connected TV.

Figure 2:
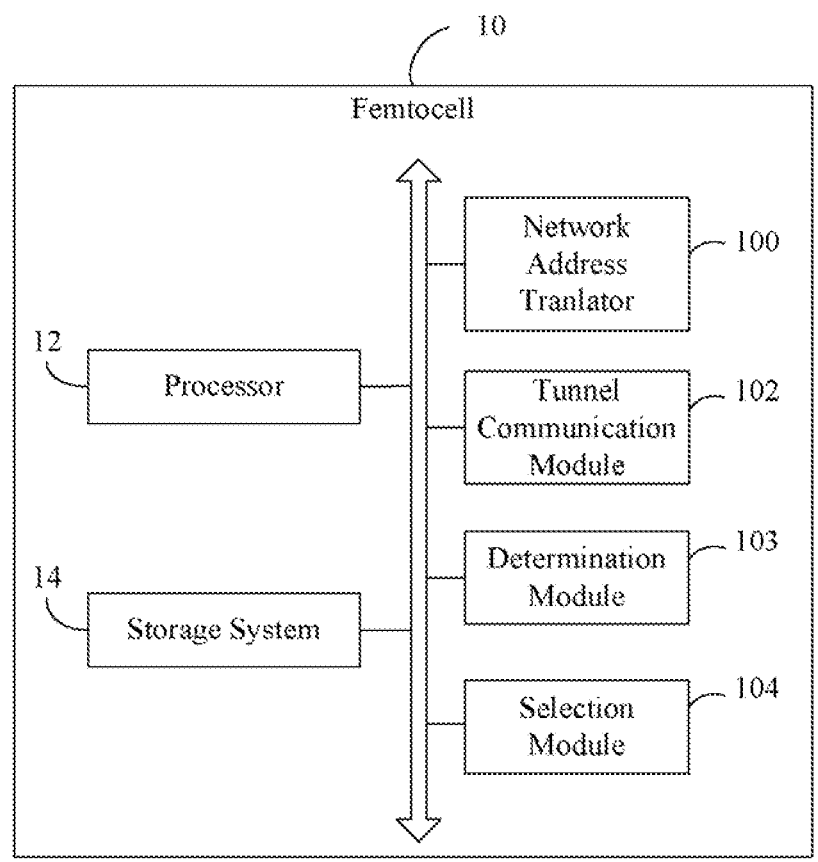
FIG. 2 is a schematic diagram of functional modules of one embodiment of the femtocell of FIG. 1.

FIG. 2 is a schematic diagram of functional modules of one embodiment of the femtocell 10 of FIG. 1. In one embodiment, the femtocell 10 includes a processor 12, a storage system 14, a network address translator 100, a tunnel communication module 102, a determination module 103, and a selection module 104. The determination module 103 and the selection module 104 may comprise computerized codes in the form of one or more programs that are stored in the storage system 14. The computerized codes include instructions that are executed by the processor 12 to provide functions for the determination module 103 and the selection module 104.

The network address translator 100 translates network address for the user terminal device 50, and the user terminal device 50 accesses to the Internet 40 according to a translated network address. Here, translating the network address indicates translating a LAN IP address to a WAN IP address embedded in each uploading packet from the user terminal device 50 to the Internet 40 and translating a WAN IP address to a LAN IP address embedded in each downloading packet from the Internet 40 to the user terminal device 50 just like a normal network address translating device (NAT). However, a normal femtocell can not translate network address like such a normal NAT.

The tunnel communication module 102 establishes a secure tunnel 30 between the user terminal device 50 and a femto gateway 22 to allow the user terminal device 50 access to the Internet 40.

The femtocell 10 allows the user terminal device 50 access to the Internet 40 using different methods according to an accessing class of the user terminal device 50. The accessing class is a desired goal of the user terminal device 50 to access to the Internet. The accessing class includes a video streaming service and a web service. For example, if a set-top box or a connected TV uses the femtocell 10 to play TV programs, the accessing class of the set-top box or the connected TV is the video streaming service. If a mobile phone or a computer uses the femtocell 10 to browse a website, such as WWW.GOOGLE.COM, the accessing class of the mobile phone or the computer is the web service.

The determination module 103 determines the accessing class of the user terminal device 50. In one embodiment, the determination module 103 determines the accessing class of the user terminal device 50 is the video streaming service according to traffic class. In another embodiment, the determination module 103 determines the accessing class of the user terminal device 50 is the web service if a port number of a port of the femtocell 10 connecting to the user terminal device 50 is equal to a specified port number, such as 80.

The selection module 104 selects the network address translator 100 or the tunnel communication module 102 to allow the user terminal device 50 access to the Internet 40 according to the accessing class of the user terminal device 50 when the femtocell 10 is in network traffic jam. The selection of the selection module 104 can decrease network traffic jam of the femtocell 10, which increases the internet accessing speed of the user terminal device 50. Hereafter are detail descriptions of the selection of the selection module 104.

When the user terminal device 50 requires the video streaming service, the selection module 104 selects the network address translator 100 to allow the user terminal device 50 access to the Internet 40. In one embodiment, the selection module 104 receives a request packet for accessing the Internet 40 from the user terminal device 50, controls the network address translator 100 to translate the Internet protocol (IP) address of the request packet, and then sends the translated request packet to the Internet 40.

Then, the selection module 104 receives a response packet from the Internet 40, and then selects the network address translator 100 to allow the user terminal device 50 access to the Internet 40.

When the user terminal device 50 requires the web service, the selection module 104 selects the network address translator 100 or the tunnel communication module 102 according to a speed of the user terminal device accessing the Internet to allow the user terminal device 50 access to the Internet 40.

In detail, the selection module 104 receives a request packet for accessing the Internet 40 from the user terminal device 50, and controls both the network address translator 100 and the tunnel communication module 102 to process the request packet and send the processed request packet to the Internet 40. Then, the selection module 104 obtains a fastest response packet corresponding to the processed request packet from the Internet 40, and determines whether the processed request packet corresponding to the fastest response packet is sent by the network address translator 100 or by the tunnel communication module 102.

If the processed request packet corresponding to the fastest response packet is sent by the network address translator 100, that is, the network address translator 100 is faster than the tunnel communication module 10 for the user terminal device 50 accessing the Internet 40, then the selection module 104 closes the secure tunnel 30 established by the tunnel communication module 102, and selects the network address translator 100 to allow the user terminal device 50 access to the Internet 40.

If the processed request packet corresponding to the fastest response packet is sent by the tunnel communication module 102, that is, the tunnel communication module 102 is faster than the network address translator 100 for the user terminal device 50 accessing the Internet 40, then the selection module 104 closes the address translation of the network address translator 100, and selects the tunnel communication module 102 to allow the user terminal device 50 access to the Internet 40.

Figure 3:
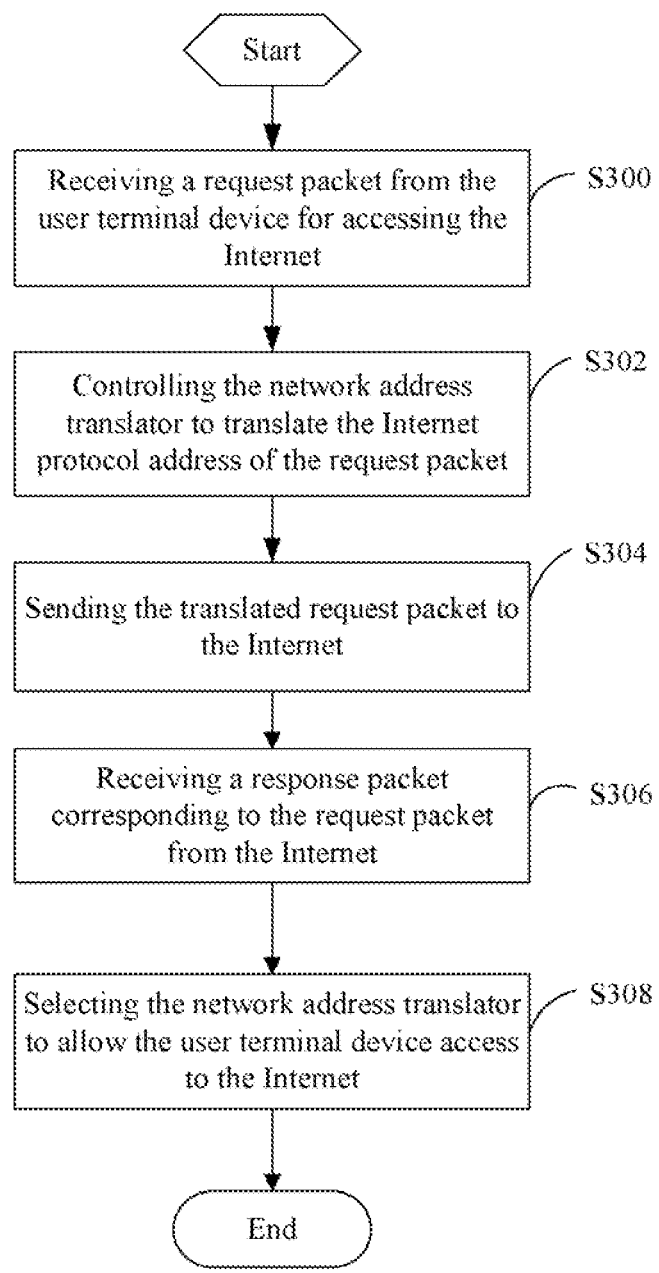
FIG. 3 is a flowchart of one embodiment of an internet accessing method of the present disclosure.

FIG. 3 is a flowchart of one embodiment of an internet accessing method of the present disclosure. The flowchart is executed by the modules of the femtocell 10 of FIG. 1 and FIG. 2. Depending on the embodiment, additional blocks may be added, others deleted, and the ordering of blocks may be changed while remaining well within the scope of the disclosure. In one embodiment, the femtocell 10 allows the user terminal device 50 requiring the video streaming service access to the Internet 40 when the femtocell 10 is in a network traffic jam.

In block S300, the selection module 104 receives a request packet for accessing the Internet 40 from the user terminal device 50, and in block S302, controls the network address translator 100 to translate the Internet protocol (IP) address of the request packet, and then in block S304, sends the translated request packet to the Internet 40.

Then in block S306, the selection module 104 receives a response packet from the Internet 40, and in block S308 the selection module 104 selects the network address translator 100 to allow the user terminal device 50 access to the Internet 40.

Figure 4:
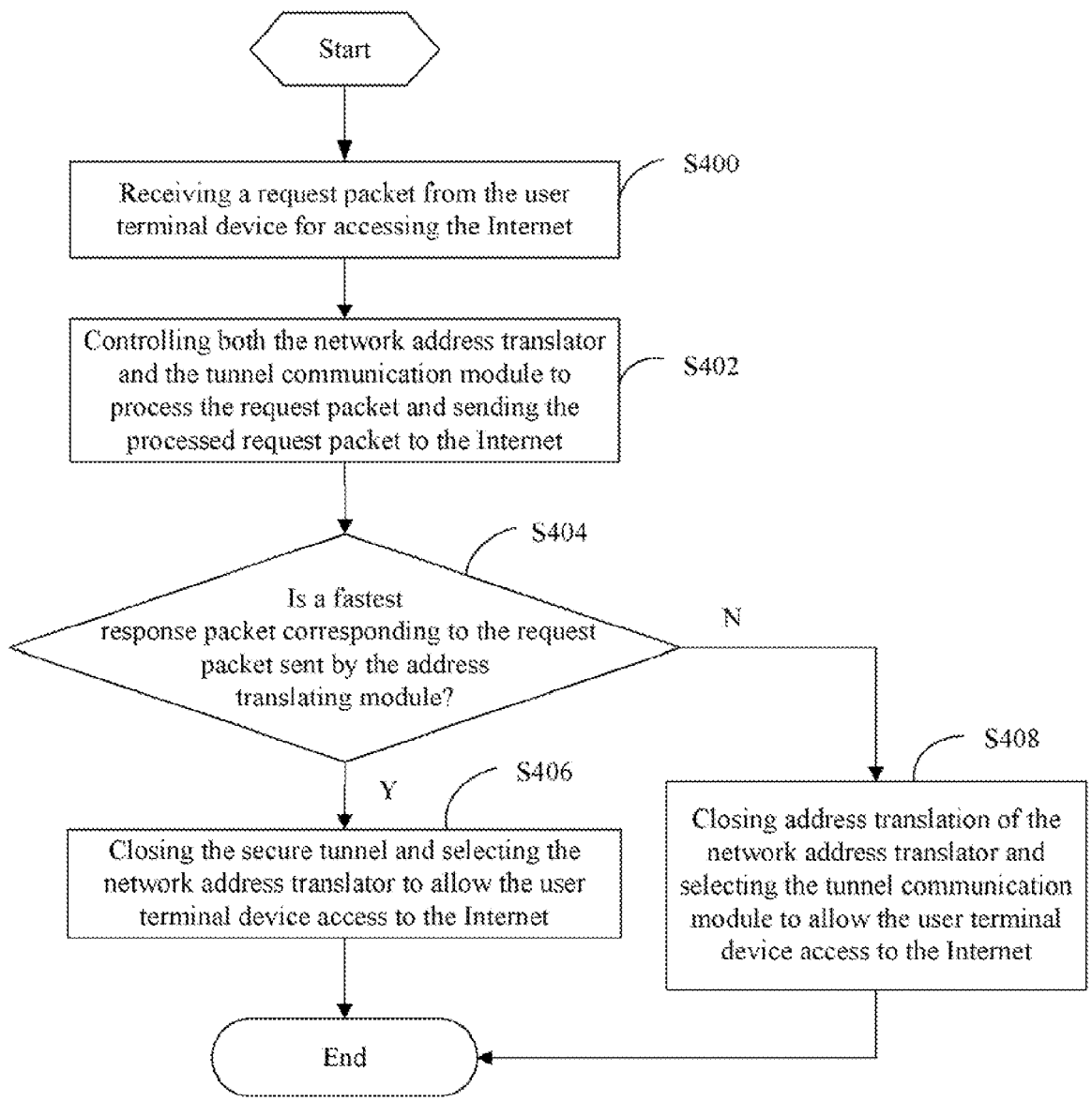
FIG. 4 is a flowchart of another embodiment of an internet accessing method of the present disclosure.

FIG. 4 is a flowchart of another embodiment of an internet accessing method of the present disclosure. The flowchart is also executed by the modules of the femtocell 10 of FIG. 1 and FIG. 2. Depending on the embodiment, additional blocks may be added, others deleted, and the ordering of blocks may be changed while remaining well within the scope of the disclosure. In one embodiment, the femtocell 10 allow the user terminal device 50 requiring the web service access to the Internet 40 when the femtocell 10 is in a network traffic jam.

In block S400, the selection module 104 receives a request packet for accessing the Internet 40 from the user terminal device 50, and in block S402, controls both the network address translator 100 and the tunnel communication module 102 to process the request packet and send the processed request packet to the Internet 40.

Then in block S404, the selection module 104 obtains a fastest response packet corresponding to the processed request packet from the Internet 40, and determines whether the processed request packet corresponding to the fastest response packet is sent by the network address translator 100 or by the tunnel communication module 102.

If the processed request packet corresponding to the fastest response packet is sent by the network address translator 100, that is, the network address translator 100 is faster than the tunnel communication module 102 for the user terminal device 50 accessing the Internet 40, then in block S406, the selection module 104 closes the secure tunnel 30 established by the tunnel communication module 102, and selects the network address translator 100 to allow the user terminal device 50 access to the Internet 40.

If the processed request packet corresponding to the fastest response packet is sent by the tunnel communication module 102, that is, the tunnel communication module 102 is faster than the network address translator 100 for the user terminal device 50 accessing the Internet 40, then in block S408, the selection module 104 stops the address translation of the network address translator 100, and selects the tunnel communication module 102 to allow the user terminal device 50 access to the Internet 40.

The femtocell 10 and the internet accessing method of the present disclosure selects the network address translator 100 or the tunnel communication module 102 to allow the user terminal device 50 access to the Internet 40 according to the accessing class of the user terminal device 50, which provides a better and more suitable accessing path for the user terminal device 50. Therefore, the femtocell 10 and the internet accessing method of the present disclosure can decrease the network traffic jam and improve the data processing efficiency of the femtocell 10.

While various embodiments of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. A femtocell for connecting a user terminal device to an Internet, comprising:
   a processor;
   a network address translator to translate network address for the user terminal device accessing the Internet;
   a tunnel communication module to establish a secure tunnel between the user terminal device and a femto gateway to allow the user terminal device access to the Internet; and
   a storage system storing computerized codes in the form of one or more programs operable to be executed by the processor, the one or more programs comprising:
      a determination module to determine a condition whether the user terminal device requires a video streaming service or a web service; and
      a selection module to select the network address translator to allow the user terminal device access to the Internet upon the condition that the user terminal device requires the video streaming service, and to select the network address translator or the tunnel communication module according to a speed of the user terminal device accessing the Internet upon the condition that the user terminal device requires the web service.

2. The femtocell as claimed in claim 1, wherein the selection module receives a request packet from the user terminal device accessing the Internet, controls the network address translator to translate an Internet protocol address of the request packet, and sends the translated request packet to the Internet.

3. The femtocell as claimed in claim 2, wherein the selection module receives a response packet corresponding to the request packet from the Internet, and selects the network address translator to allow the user terminal device access to the Internet.

4. The femtocell as claimed in claim 1, wherein the selection module receives a request packet from the user terminal device accessing the Internet, and controls both the network address translator and the tunnel communication module to process the request packet and send the processed request packet processed by both the network address translator and the tunnel communication module to the Internet.

5. The femtocell as claimed in claim 4, wherein the selection module obtains a fastest response packet corresponding to the processed request packet processed by the network address translator or the tunnel communication module.

6. The femtocell as claimed in claim 5, wherein the selection module selects the network address translator to allow the user terminal device access to the Internet upon a condition that the processed request packet corresponding to the fastest response packet is sent by the network address translator, or selects the tunnel communication module to allow the user terminal device access to the Internet upon a condition that the processed request packet corresponding to the fastest response packet is sent by the tunnel communication module.

7. An internet accessing method of a femtocell to allow a user terminal device access to the Internet, the femtocell comprising a tunnel communication module to establish a secure tunnel between the user terminal device and a femto gateway to allow the user terminal device access to the Internet, the method comprising:
   providing a network address translator in the femtocell to translate a network address to allow the user terminal device access to the Internet;
   determining whether the user terminal device requires a video streaming service or a web service;
   selecting the network address translator to allow the user terminal device access to the Internet if the user terminal device requires the video streaming service; and
   selecting the network address translator or the tunnel communication module according to a speed of accessing the Internet of the user terminal device if the user terminal device requires the web service.

8. The internet accessing method as claimed in claim 7, wherein the block of selecting the network address translator comprises:
   receiving a request packet from the user terminal device access the Internet;
   controlling the network address translator to translate an Internet protocol address of the request packet;
   sending the translated request packet to the Internet;
   receiving a response packet corresponding to the request packet from the Internet; and
   selecting the network address translator to allow the user terminal device access to the Internet.

9. The internet accessing method as claimed in claim 7, wherein the block of selecting the network address translator or the tunnel communication module according to the speed of the user terminal device accessing the Internet comprises:
   receiving a request packet from the user terminal device to access the Internet; and
   controlling both the network address translator and the tunnel communication module to process the request packet and send the processed request packet processed by both the network address translator and the tunnel communication module to the Internet.

10. The internet accessing method as claimed in claim 9, wherein the block of selecting the network address translator or the tunnel communication module according to the speed of the user terminal device accessing the Internet further comprises:
   obtaining a fastest response packet corresponding to the processed request packet processed by the network address translator or the tunnel communication module.

11. The internet accessing method as claimed in claim 10, wherein the block of selecting the network address translator or the tunnel communication module according to the speed of the user terminal device accessing the Internet further comprises:
   determining whether the processed request packet corresponding to the fastest response packet is sent by the network address translator or by the tunnel communication module;
   selecting the network address translator to allow the user terminal device access to the Internet if the processed request packet is sent by the network address translator; or
   selecting the tunnel communication module to allow the user terminal device access to the Internet if the processed request packet is sent by the tunnel communication module.

* * * * *